United States Patent
Wilairat

(10) Patent No.: US 8,416,192 B2
(45) Date of Patent: Apr. 9, 2013

(54) CONCURRENTLY DISPLAYING MULTIPLE CHARACTERS FOR INPUT FIELD POSITIONS

(75) Inventor: Weerapan Wilairat, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1003 days.

(21) Appl. No.: 12/366,408

(22) Filed: Feb. 5, 2009

(65) Prior Publication Data

US 2010/0194690 A1    Aug. 5, 2010

(51) Int. Cl.
- *G06F 3/02* (2006.01)
- *G06F 3/041* (2006.01)
- *G06F 17/00* (2006.01)

(52) U.S. Cl.
USPC ........... 345/168; 345/172; 345/173; 715/246; 715/256

(58) Field of Classification Search ................... 345/156, 345/168–169, 179, 172–173; 715/246
See application file for complete search history.

(56) References Cited

U.S. PATENT DOCUMENTS

| | | | |
|---|---|---|---|
| 6,011,554 A * | 1/2000 | King et al. | 715/811 |
| 6,801,190 B1 | 10/2004 | Robinson | |
| 7,129,932 B1 * | 10/2006 | Klarlund et al. | 345/168 |
| 7,251,367 B2 | 7/2007 | Zhai | |
| 7,508,324 B2 * | 3/2009 | Suraqui | 341/22 |
| 2006/0022956 A1 | 2/2006 | Lengeling | |
| 2007/0205993 A1 * | 9/2007 | Gloyd et al. | 345/169 |
| 2008/0122796 A1 | 5/2008 | Jobs | |

FOREIGN PATENT DOCUMENTS

WO    WO-2005008899    1/2005

OTHER PUBLICATIONS

"Relative Keyboard Input System", Retrieved from <http://www.cs.cmu.edu/~nasmith/papers/rashid+smith.iui08.pdf>, 4 pages.
"PocketCM Keyboard 0.23", Retrieved from <http://handheld.softpedia.com/get/System-Utilities/Enhancements/PocketCM-Keyboard-44772.shtml>, 2 pages.
"Touchscreen Software Keyboard for Finger Typing", Retrieved from <http://intechweb.org/downloadpdf.php?id=5554&PHPSESSID=jmnlh9a87b1ghh25hs32lkl7i5>, 10 pages.

\* cited by examiner

*Primary Examiner* — Lun-Yi Lao
*Assistant Examiner* — Jarurat Suteerawongsa
(74) *Attorney, Agent, or Firm* — Wolfe-SBMC

(57) ABSTRACT

For each of multiple user inputs, multiple keys of a keyboard that are touched as part of the user input are identified. Additionally, for each of the multiple user inputs, multiple characters that are to be displayed concurrently are determined based on the multiple keys that are touched as part of the user input. Both a character input field and the multiple characters determined for each of the multiple user inputs are displayed. One or more suggested inputs can also be displayed, and a user-selected one of the suggested inputs identified as an input to the character input field.

20 Claims, 11 Drawing Sheets

CONCURRENTLY DISPLAYING MULTIPLE CHARACTERS FOR INPUT FIELD POSITIONS

BACKGROUND

As computing technology has advanced, small devices with a great deal of computing power have become commonplace. While such small devices have many advantages, including their ease of portability, they are not without their problems. One such problem is difficulty on the part of users in inputting requests to the devices. Many devices have keyboards or keypads with very small keys, making it difficult for users to press only the particular key that they desire. This can lead to many incorrect key presses by the user, and detract from the usability of the devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, for each of multiple user inputs, multiple keys of a keyboard that are touched as part of the user input are identified. For each of the multiple user inputs, multiple characters that are to be displayed concurrently are determined based on the multiple keys that are touched as part of the user input. Both a character input field and the multiple characters determined for each of the multiple user inputs are displayed.

In accordance with one or more aspects, one or more suggested inputs can also be displayed with the character input field and the multiple characters. A user selection of one of the suggested inputs can be received, and the selected suggested input identified as an input to the character input field.

BRIEF DESCRIPTION OF THE DRAWINGS

The same numbers are used throughout the drawings to reference like features.

DETAILED DESCRIPTION

Concurrently displaying multiple characters for input field positions is discussed herein. A character input field is displayed into which the user can input one or more characters. In response to each user input, one or more keys that are pressed by the user as part of the input are identified. Each character corresponding to one of these keys is displayed concurrently as an input option for a particular position in the character input field. The characters displayed can be arranged in a character list that partially overlaps that particular position. The characters can optionally be displayed in accordance with a ranking that is based on how much each of the particular keys is touched.

In addition to displaying these character lists, an input suggestion list can also be displayed to the user. The input suggestion list identifies suggested words or other inputs based on the keys pressed, and can change each time the user presses one or more additional keys. The user can also select an input from the suggestion list to be the input to the character input field.

Figure 1:
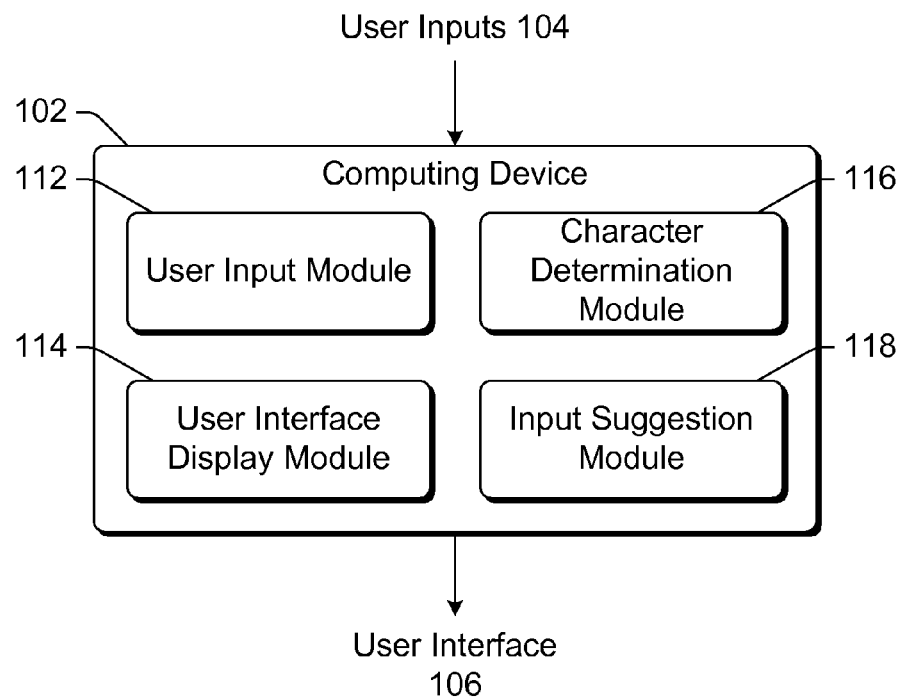
FIG. 1 illustrates an example system implementing the concurrently displaying multiple characters for input field positions in accordance with one or more embodiments.

FIG. 1 illustrates an example system 100 implementing the concurrently displaying multiple characters for input field positions in accordance with one or more embodiments. System 100 includes a computing device 102 that can receive user inputs 104 and generate a user interface 106 based on inputs 104. Computing device 102 can optionally include a display device on which user interface 106 is displayed. Alternatively, the display device can be separate from computing device 102 and computing device 102 can output signals to the display device to have the display device display the user interface 106.

Computing device 102 can be a variety of different devices capable of receiving user inputs and generating a user interface. For example, computing device 102 can be a cellular or other wireless phone, a personal digital assistant or handheld computer, a portable music and/or video playback device, a desktop computer, a mobile station, an entertainment appliance, a set-top box communicatively coupled to a display device, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Computing device 102 includes a user input module 112, a user interface display module 114, a character determination module 116, and an input suggestion module 118. Generally, user input module 112 receives user inputs 104. Character determination module 116 generates character lists each including one or more characters based on user inputs 104. Additionally, input suggestion module 118 generates a list of one or more suggested inputs. User interface display module 114 generates user interface 106 based at least in part on these character lists and one or more suggested inputs.

User input module 112 receives user inputs 104 in the form of one or more keys of a keyboard that are pressed or touched by a user. The keyboard can include a variety of different characters such as letters, numbers, punctuation, other symbols, and so forth. The keys corresponding to these various characters can be laid out in a variety of different patterns. User inputs 104 can also include user selections of characters or inputs in a list, as discussed in more detail below.

In one or more embodiments, the keyboard is a "soft" keyboard in which a representation of a keyboard is displayed to the user and the user is able to select keys by pressing or touching representations of those keys on the displayed keyboard. A variety of different well-known touch input screen or touch panel technologies can be used to display the soft keyboard and receive user inputs. Alternatively, the keyboard via which user input 104 is received can be a physical keyboard having multiple physical keys that can be pressed by the user. A variety of different well-known technologies can be used to determine which keys are pressed by the user.

Each key on the keyboard is associated with or corresponds to one character at any given time, and each user input 104 is typically an intended input of a single key by the user. However, oftentimes when the user intends to press a single key, he or she actually presses multiple keys. This can be due to a variety of different reasons such as the small size of the keys on the keyboard, lack of user focus in selecting an individual key, and so forth. The one or more keys that are pressed are received by user input module 112 as user input 104. For example, using a standard QWERTY keyboard layout, a user may intend to press the "f" key, but may actually press the "f", "g", "t", and "r" keys. The pressing of the "f", "g", "t", and "r" keys is received by user input module 112 as user input 104. Accordingly, user input module 112 can receive an indication of one or more keys each time the user actually intends to press a single key (and thus intends to input a single character).

In situations where multiple keys are pressed as a user input 104, user input module 112 can also optionally determine a portion of each of the multiple keys was touched. Each key on the keyboard typically has an associated selection area, and the user presses the key by touching that selection area. The portion of a key that is touched refers to the portion of the selection area associated with that key that was touched. For example, when intending to press the "f" key, but actually pressing the "f", "g", "t", and "r" keys, the user's finger may have touched 65% of the "f" key, 35% of the "g" key, 30% of the "t" key, and 20% of the "r" key. These percentages or portions of each of the keys that were touched can be identified by user input module 112.

The portion of each of the multiple keys that was touched as part of a user input 104 can be identified by module 112 in a variety of different manners. For example, if the keyboard is a soft keyboard, then the touch input screen technology can allow module 112 to determine specific parts of the keyboard that were touched and thus readily identify the portion of each of the multiple keys that was touched. By way of another example, if the keyboard has physical keys with touch sensing technology that allows specific portions of each individual key that was touched to be identified, module 112 can use these specific portions to readily identify the portion of each of the multiple keys that was touched Character determination module 116 receives an indication from user input module 112 of one or more keys that were pressed as a user input 104. Character determination module 116 generates a list of one or more characters that are to be displayed as corresponding to or being associated with a particular position in a character input field displayed as at least part of user interface 106. Each user input 104 corresponds to a different position in the character input field, and character determination module 106 generates a character list for each user input 104. In situations where the character list includes multiple characters, the multiple characters are displayed concurrently as corresponding to a particular position in the character input field.

Figure 2:
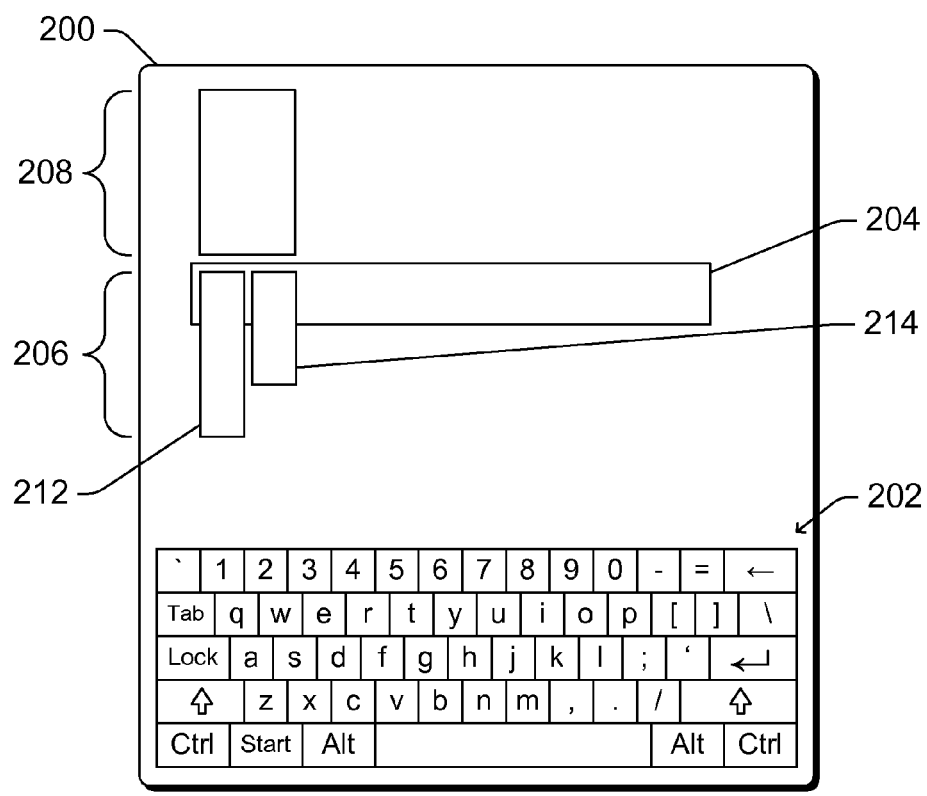
FIG. 2 illustrates an example user interface that can be displayed in accordance with one or more embodiments of the concurrently displaying multiple characters for input field positions.

FIG. 2 illustrates an example user interface 200 that can be displayed in accordance with one or more embodiments of the concurrently displaying multiple characters for input field positions. In the example of FIG. 2, user interface 200 includes a soft keyboard 202 having a QWERTY layout. It is to be appreciated, however, that keyboard 202 is only an example. Alternatively, as discussed above, a physical keyboard rather than a soft keyboard can be used, a different keyboard layout can be used, and so forth.

User interface 200 includes a character input field or section 204. Character input field 204 is displayed to the user as a field or section into which the user can input characters by pressing keys of keyboard 202. It is to be appreciated that character input field 204 is an example of an input user interface that can be used with the concurrently displaying multiple characters for input field positions discussed herein. Other input user interfaces can be displayed using the concurrently displaying multiple characters for input field positions discussed herein, such as input user interfaces that are part of a menu, input user interfaces that are an entry in a drop-down or pull-down menu, and so forth.

The list of characters generated by character determination module 106 of FIG. 1 is displayed in portion 206 of user interface 200. A different list of characters is displayed for each different position in character input field 204. Each position in character input field 204 refers to a location where a character can be input. For example, if the user were entering the word "top", then the character "t" would be in a first position, the character "o" would be in a second position, and the letter "p" would be in a third position. In the example of FIG. 2, two character lists 212 in 214 are illustrated, with character list 212 corresponding to a first position in character input field 204 and character list 214 corresponding to a second position in character input field 204. Each of these character lists in portion 206 can also be referred to as a "letter stack".

In the example of FIG. 2, one character in each character list displayed in portion 206 is displayed as being in character input field 204 at the position corresponding to the character list. The remaining characters in each character list are displayed adjacent to the position corresponding to the character list.

User interface 200 also includes an input suggestion list portion 208 in which one or more suggested inputs are displayed. The generation and use of the input suggestion list is discussed in more detail below.

Additionally, as discussed in more detail below, a user is able to select a particular character within a character list in portion 206 and/or a particular suggested input in input suggestion list portion 208. Portions 206 and 208 are displayed as part of (or corresponding to) a touch input screen. Characters and suggested inputs displayed in portions 206 and 208 respectively are typically displayed larger and/or with more surrounding space than the keys in keyboard 202. Additionally, the selection areas on the touch input screen of user interface 200 corresponding to these characters and suggested inputs displayed in portions 206 and 208 can be larger than the selection areas of the keys in keyboard 202. This allows a user to more easily select a single character or a single suggested input in portion 206 or 208.

In the example of FIG. 2, character input field 204 is displayed as a horizontal input field, each character list in portion 206 is displayed as a vertical column of characters, and the input suggestion list in portion 208 is displayed as a vertical column of input suggestions. Alternatively, other display configurations can be used. For example, character input field 204 can be displayed as a vertical input field, each character list in portion 206 can be displayed as a horizontal row of characters, and the input suggestion list in portion 208 can be displayed as a horizontal row of input suggestions.

Additionally, in the example of FIG. 2, portion 208 is displayed as being adjacent to character input field 204. Alternatively, portion 208 can be displayed in other locations further away from character input field 204. Similarly, each character list in portion 206 is displayed as being partially overlapping character input field 204. Alternatively, portion 206 can be displayed without overlapping character input field 204, such as adjacent to character input field 204, close to the soft keyboard to reduce finger movement by the user, or in other locations further away from character input field 204.

Returning to FIG. 1, character determination module 116 generates, for each position in the character input field, a character list including one or more characters that are to be displayed as being associated with that position. The characters included in the character list are the characters identified by user input module 112 as having been pressed or touched as part of a user input 104.

The order of characters in the character list can be determined by module 116 in a variety of different matters. In one or more embodiments, the order of characters is in accordance with a ranking of the characters that is generated based on the portions of each of the multiple keys that were touched as the user input 104. Characters associated with keys having a larger portion touched are ranked higher than characters associated with keys having a smaller portion touched. As an example, following the example above where the user's finger touched 65% of the "f" key, 35% of the "g" key, 30% of the "t" key, and 20% of the "r" key, the characters are ranked in the following order: "f", "g", "t", "r", with the character "f" being the highest ranking character. The highest ranking character is displayed at the top or front of the character list, which in the example of FIG. 2 is the character in the character list displayed in character input field 204. If equal portions of two or more different characters are touched, then these two or more different characters can be ranked in other manners, such as alphabetically, randomly, etc.

Alternatively, rather than using this ranking, the order of characters in the character list can be determined by module 116 in other matters. For example, the order of characters can be determined alphabetically, according to general common usage of characters, according to common usage of characters on computing device 102, randomly, according to other rules or criteria, and so forth.

In one or more embodiments, character determination module 106 includes in a character list corresponding to a particular position, all of the characters associated with the multiple keys touched as part of the user input 104. Alternatively, the number of characters included in a character list can be limited to a threshold number of characters. This threshold number of characters can be determined in a variety of different manners, such as based on available display space in the user interface, being set as a default number provided by a developer or seller of computing device 102, being set as a number requested by a user of computing device 102, according to other rules or criteria, and so forth.

In embodiments where a character list is limited to a threshold number of characters, if the number of keys touched exceeds this threshold number then the particular characters included in the character list can be identified in a variety of different manners. For example, the characters included in the character list can be determined in accordance with the ordering of characters in the character list discussed above. As a specific example, if the threshold number of characters is three and the characters in the character list are determined by module 116 to have an order of "f", "g", "t", "r", then the characters in the character list would be "f", "g", "t".

Additionally, a user input 104 can be a selection of a character in a character list generated by character determination module 116. In response to such a user input 104, user input module 112 or character determination module 116 identifies the particular character that is selected based on the user input. For example, the location of a touch input screen can be received as user input 104, and module 112 or 116 can determine the particular character in the character list that is displayed at that location.

The selection areas for the characters in the character lists can be larger than the selection areas of the keys on the keyboard, so a single character in a character list can typically be easily selected by a user. The selection areas for characters in the character lists can be larger than the selection areas of the keys on the keyboard in one or more dimensions and/or directions. For example, the selection areas for characters in the character lists can be wider in one or more directions and/or longer in one or more directions than the selection areas of the keys on the keyboard. Additionally, the spacing between characters in the characters lists can be increased so that the spacing between two characters in a character list is greater than the spacing between two keys on the keyboard, allowing a user to more easily select a single character in the character list.

In response to a user selection of a character in a character list generated by character determination module 116, module 116 alters the character list to include only the user selected character. Other characters that were previously in that character list are removed from the character list and only the user selected character is displayed.

Additionally, in one or more embodiments character determination module 116 determines the characters to include in a particular character list based at least in part on previously generated character lists that are being displayed. For example, referring to FIG. 2, the characters in list 214 can be determined by module 116 based at least in part on the characters in list 212. Character determination module 116 makes this determination by combining the characters in the previous character list or lists with the possible characters in the character list currently being determined by module 116. These characters are combined in the same order as their corresponding positions in the character input field. Each possible combination is compared to inputs in an input library in the combinations that do not form a valid input from the input library have the corresponding character removed from the character list by module 116.

It should be noted, however, that situations may arise where the user is intentionally entering a string of characters that do not form a valid input in the input library. Accordingly, character determination module 116 can be configured to have a character removed from the character list if it does not form a valid input from the input library, or alternatively can be configured to ignore such situations and not remove the character from the character list. This configuration of module 116 can optionally be a user-configurable setting, allowing the user to set a preference as to whether module 116 should or should not remove a character in such situations. Alternatively, such situations can be managed in different manners, such as by module 116 not removing the highest ranked character in a character list regardless of whether it can be combined to form a valid input from the input library, but removing lower-ranked characters if they cannot be combined to form a valid input from the input library.

For example, assume that character determination module 116 is configured to allow removal of a character from a character list that cannot be combined with characters from the other character list or lists to form a valid input from the input library. Further assume a first character list includes characters "g", "t", and "f", and the next user input 104 includes the user pressing keys "w" and "e". The various combinations are "gw", "tw", "fw", "ge", "te", and "fe". Further assume that the input library includes no inputs that begin with "gw", "tw", or "fw". Accordingly, in this example the character "w" can be removed from the character list as it does not combine with the characters from the first character list to form a valid input from the input library. However, if module 116 were configured so that the highest ranked character in a character list is not to be removed, then if "w" were the highest ranked character in the character list with "w" and "e", then "w" would not be removed from the character list.

Alternatively, rather than determining characters in a character list currently being generated based on one or more previously generated character lists, one or more characters in a previously generated character list or lists can be removed based on characters in a character list currently being generated. For example, assume a first character list includes characters "q", "w", and "s", and the next user input 104 includes the user pressing keys "t" and "g". The various combinations are "qt", "wt", "st", "qg", "wg", and "sg". Further assume that the input library includes no inputs that begin with "qt" or "qg". Accordingly, in this example the character "q" can be removed from the first character list as it does not combine with the characters from the second character list to form a valid input from the input library. However, if module 116 were configured so that the highest ranked character in a character list is not to be removed, then if "q" were the highest ranked character in the character list with "q", "w", and "s", then "q" would not be removed from the character list.

The input library can be determined in a variety of different manners. For example, the input library can be one or more of a dictionary of common words, a dictionary of all words in a particular language, a listing of character strings commonly input by a user of device 102, a listing of character strings previously entered by a user of device 102, an address book or e-mail address book, and so forth.

Input suggestion module 118 identifies one or more suggested inputs (also referred to as input suggestions) to be displayed as part of user interface 106. In the example of FIG. 2, these suggested inputs are displayed in input suggestion list portion 208. Module 118 identifies suggested inputs based at least in part on the characters in the character lists generated by character determination module 116. As the characters in the character lists change, such as due to user inputs 104 of characters corresponding to additional positions in the character input field and/or user selection of characters in a character list corresponding to a position in the character input field, module 118 re-identifies the suggested inputs to be displayed as part of user interface 106.

A user input 104 can be a selection of a suggested input in the list generated by input suggestion module 118. In response to such a user input 104, user input module 112 or input suggestion module 118 identifies the particular suggested input that is selected based on user input. For example, the location of a touch input screen can be received as user input 104, and module 112 or 118 can determine the particular suggested input in the list that is displayed at that location. In response to a user selection of a suggested input, the selected input is used as the input to the character input field (e.g., field 204 of FIG. 2). As discussed above, the selection areas for suggested inputs in the suggested input list can be larger than the selection areas of the keys on the keyboard, so a single suggested input in the suggested input list can typically be easily selected by a user.

It should be noted that the selection areas for suggested inputs can be larger than the selection areas of the keys on the keyboard in one or more dimensions and/or directions. For example, the selection areas for suggested inputs can be wider in one or more directions and/or longer in one or more directions than the selection areas of the keys on the keyboard. Additionally, the spacing between inputs in the suggested input list can be increased so that the spacing between two inputs in the suggested input list is greater than the spacing between two keys on the keyboard.

Input suggestion module 118 can generate an input suggestion list in a variety of different manners. In one or more embodiments, an input library is accessed to identify input suggestions based on the characters in the character lists being displayed. This input library can be determined in a variety of different manners, as discussed above. Additionally, the input library used by module 118 can be the same input library, or alternatively a different input library, than the input library used by module 116 discussed above.

In one or more embodiments, input suggestion module 118 follows a particular set of rules or criteria in determining the input suggestions to include in the input suggestion list. For example, input suggestion module 118 can use the following rules to prioritize input suggestions and determine their placement in the input suggestion list (with higher-prioritized input suggestions being placed higher in the list than lower-prioritized input suggestions): inputs having the same number of characters as positions have been filled in the character input field have higher priority than inputs with more characters; and inputs with higher ranked characters have higher priority than inputs with lower ranked characters. Thus, in this example, if there have been two user inputs so far, corresponding to first and second positions in the character input field, then two-character inputs in the input library that match the characters in the character lists corresponding to those positions have higher priority than inputs with three or more characters. Additionally, continuing this example, inputs in the input library having higher-ranked characters in the character lists have higher priority than inputs having lower-ranked characters in the character lists.

A character position in the character input field is filled if one or more characters have already been entered for that character position. A character list including multiple characters can correspond to this character position, and the particular character for that character position may or may not yet be known.

By way of example, assume that the first character list includes characters ranked in the order "b", "g", "h", and a second character list includes characters ranked in the order "e", "r". As two positions in the character input field have been filled so far, two-character inputs in the input library are given higher priority. Assuming that the input library includes input words of "be" and "he", then these two inputs are given highest priority as they have the same number of characters as have been filled in the character input field. Additionally, "be" is ranked higher than "he" because "b" is ranked higher than "h". If additional inputs are included in the input suggestion list, these additional inputs are selected based on the number of characters in the inputs (with shorter inputs being favored over longer inputs to keep the character count as close to two as possible) and the ranking of the characters in the character lists. Accordingly, three-character inputs in the input library beginning with "be" are given higher priority. Assuming that the input library includes an input word of "bee", then the word "bee" is given the next highest priority after "be" and "he".

The rankings of characters across character lists can be managed in a variety of different manners. In one or more embodiments, characters in the character list corresponding to the first position of the character input field are given higher priority than characters in the character list corresponding to the second position of the character input field, characters in the character list corresponding to the second position of the character input field are given higher priority than characters in the character list corresponding to the third position of the character input field, and so forth. For example, if the first character list includes characters ranked in the order "b", "g", "h", and the second character list includes characters ranked in the order "i", "e", the word "be" would be given higher priority in the suggestion list than the word "hi", because the character "b" in the first character list is given priority over the letter "i" in the second character list.

Alternatively, the rankings of characters across character lists can be managed in other manners, such as based on portions of keys that were actually touched (e.g., these portions can be maintained by computing device 102), randomly, according to other rules or criteria, and so forth.

In one or more embodiments, input suggestion module 118 is limited to a threshold number of inputs. This threshold number of inputs can be determined in a variety of different manners, such as based on available display space in the user interface, being set as a default number provided by a developer or seller of computing device 102, being set as a number requested by a user of computing device 102, according to other rules or criteria, and so forth.

Alternatively, input suggestion module 118 can determine the input suggestions to include in the input suggestion list in different manners. For example, the input suggestions can be determined alphabetically, according to general common usage of inputs, according to common usage of inputs on computing device 102, according to most recently used inputs on device 102, according to grammar rules, randomly, according to other rules or criteria, and so forth.

Additionally, input suggestion module 118 can impose a lower threshold on the number of characters that have been filled in the character input field, and does not generate an input suggestion list until the lower threshold number of characters have been filled in the character input field. For example, module 118 can impose a lower threshold of two characters, so that no input suggestion list is generated until at least two characters in the character input field have been filled in.

Furthermore, the order of the input suggestions displayed in the input suggestion list can be determined in a variety of different manners. In one or more embodiments, the display order of the input suggestions is based on the rankings of the characters in the character lists, with inputs having higher ranked characters being given priority (e.g., displayed higher, or alternatively lower, in the suggestion list) than lower ranked characters. Alternatively, the display order of the input suggestions can be determined in other manners, such as alphabetically, according to general common usage of the inputs, according to common usage of the inputs on computing device 102, according to most recently used inputs on device 102, randomly, according to other rules or criteria, and so forth.

Additionally, it should be noted that the input suggestions in the input suggestion list can change in response to user selection of a character in a character list. Any input suggestion in the input suggestion list having a non-selected character in a position corresponding to that position in the character input field is removed from the input suggestion list. For example, if the character list corresponding to the first position in the character input field includes the characters "b", "g", and "h", and the user selects the "g" character from that character list, then any input suggestions in the input suggestion list having a first character of "b" or "h" are removed from the input suggestion list. By way of another example, if the character list corresponding to the fifth position in the character input field includes the characters "@", "#", and "w", and the user selects the "@" character from that character list, then any input suggestions in the input suggestion list having a fifth character of "#" or "w" are removed from the input suggestion list.

Figure 3:
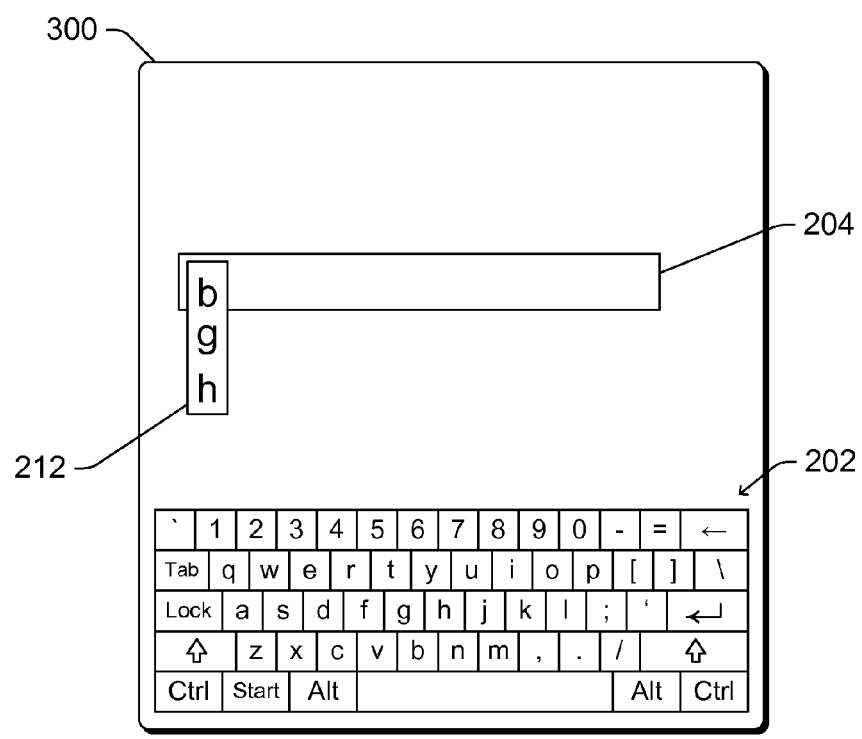
FIGS. 3, 4, 5, 6, and 7 illustrate example user interfaces that can be displayed in accordance with one or more embodiments of the concurrently displaying multiple characters for input field positions.
Figure 4:
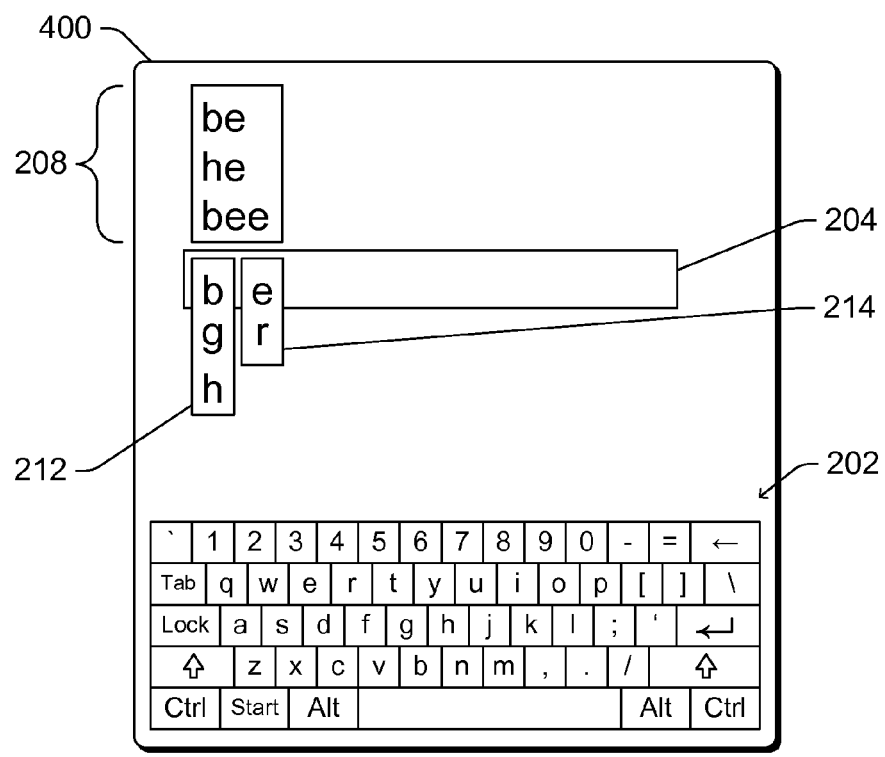
Figure 5:
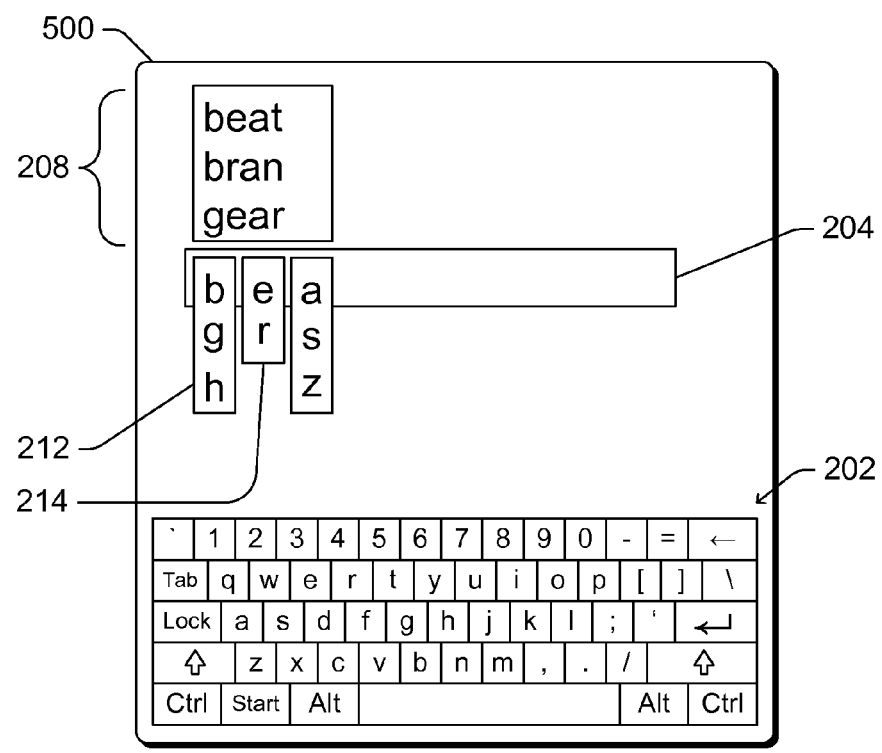

As a more specific example, assume that a user intends to type in the word "beautiful" in a character input field. FIGS. 3, 4, and 5 help illustrate this example, showing example user interfaces that can be displayed in accordance with one or more embodiments of the concurrently displaying multiple characters for input field positions.

The first key the user intends to press is the "b" key, but the user actually touches the "b", "g", and "h" keys. Also, assume that a lower threshold of two is imposed on the number of character positions filled in the character input field. User interface 300 of FIG. 3 illustrates the result, with a character list corresponding to the first position in the character input field including the characters "b", "g", and "h". In user interface 300, no input suggestion list is displayed as only one character position has been filled in and the lower threshold of two has not met.

The second key the user intends to press is the "e" key, but the user actually touches the "e", "r", and "d" keys. However, assume that the character "d" cannot be combined with any of the characters "b", "g", and "h" to form part of a word in the input library. Therefore, the character "d" can be removed from the character list corresponding to the second position. User interface 400 of FIG. 4 illustrates the results, with the character list corresponding to the first position in the character input field including the characters "b", "g", and "h", and the character list corresponding to the second position in the character input field including the characters "e" and "r".

As the lower threshold of two imposed on the number of character positions filled in the character input field has now been met, an input suggestion list is now displayed. This input suggestion list includes the words "be", "he", and "bee".

The third key the user intends to press is the "a" key, but the user actually touches the "a", "s", and "z" keys. User interface 500 of FIG. 5 illustrates the results, with a character list corresponding to the first position in the character input field including the characters "b", "g", and "h", the character list corresponding to the second position in the character input field including the characters "e" and "r", and the character list corresponding to the third position in the character input field including the characters "a", "s", and "z". An input suggestion list including the words "beat", "bran", and "gear" is also displayed.

A display of character lists corresponding to positions in the character input field and the input suggestion list continue in a like manner as the user presses additional keys.

It is to be appreciated that, in the examples of FIGS. 3-5, the user can optionally select a character in a character list corresponding to a position in the character input field or an input in the input suggestion list. For example, if the user were actually intending to enter the word "bran", then the user can touch the word "bran" in the input suggestion list of user interface 500, causing the word "bran" to be used as the input to the character input field. The character lists and input suggestion list can then be removed from the user interface because the input to the character input field is completed. Alternatively, in order to accommodate the user inputting multiple words, the character lists and input suggestion list can continue to be displayed until the user indicates completion of user inputs. The user can indicate completion of user inputs in different manners, such as by pressing the spacebar, by pressing an arrow key, by pressing an "enter" key, and so forth. The particular key or keys that can be pressed to indicate completion of user inputs can optionally be a user-configurable setting. By way of another example, the user could also touch the letter "b" in the character list corresponding to the first position in the character input field of user interface 400, causing the letters "g" and "h" to be removed from that character list and the word "he" to be removed from the input suggestion list. Optionally, in such a situation a different word beginning with "be" or "br" could be added to the input suggestion list.

From the discussions and examples included herein, it can be seen that the user can press keys to enter his or her desired input without needing to be overly concerned with backspacing or deleting incorrect key presses. The user can select characters from the character lists corresponding to particular positions of the character input field to specify which of multiple keys was intended to be pressed. Additionally, the user can continue typing until his or her desired input is displayed in the input suggestion list.

As discussed above, the selection areas of the characters in the character list and the suggested inputs in the input suggestion list can be larger in one or more directions. The size and directions in which the selections areas can be larger can vary, and can optionally depend on available space in the user interface. The available space can be limited, for example, by other character lists, by other parts of the suggestion list, by the soft keyboard, and so forth. Furthermore, additional spacing can be used between characters in the character list and/or suggested inputs in the input suggestion list, allowing a user to more easily select a single character in the character list and/or a single suggested input in the input suggestion list.

Figure 6:
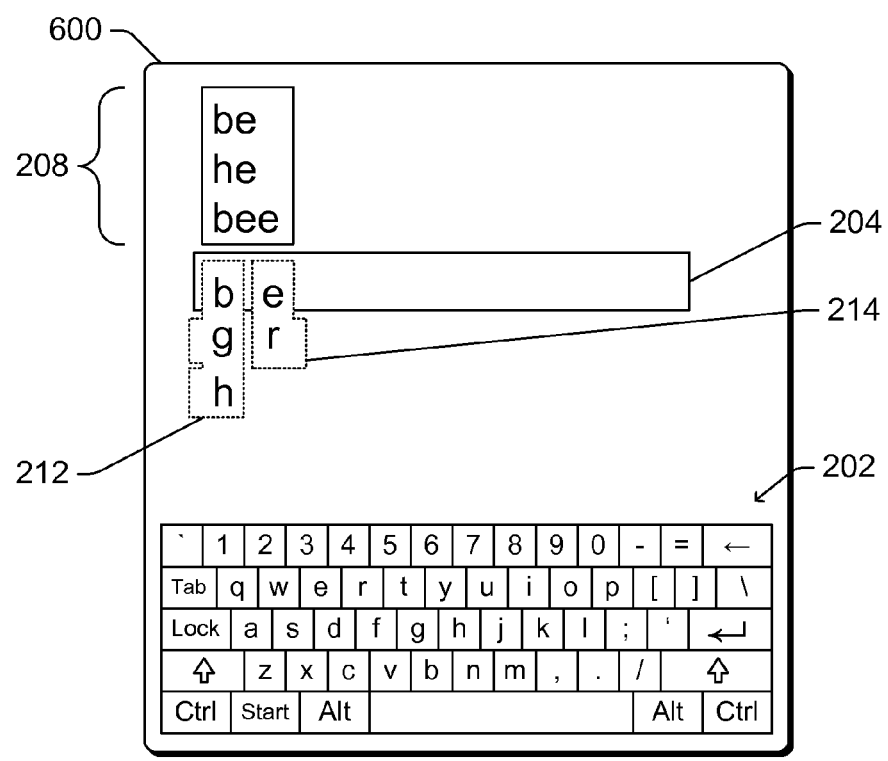

FIG. 6 shows an example user interface that can be displayed in accordance with one or more embodiments of the concurrently displaying multiple characters for input field positions. User interface 600 of FIG. 6 is similar to user interface 400 of FIG. 4, except that the character lists have been illustrated with dashed lines representing the selection areas for the characters in the character list. As can be seen in user interface 600, the selection areas of the "g" and "h" characters are larger in the left direction and the selection area of the "r" character is larger in the right direction as there is sufficient space in the user interface to extend those selection areas in that direction. However, there is insufficient space to extend the selection areas for the "b", "e" and "r" characters in the left direction, so those selection areas are not extended. Similarly, there is insufficient space to extend the selection areas for the "b", "g", "h", and "e" characters in the right direction, so those selection areas are not extended. Alternatively, the selection area of the "h" character could be larger in the right direction and/or the selection area of the "r" character could be larger in the down direction.

Alternatively, additional spacing between the "b" and "g" characters, between the "g" and "h" characters, and between the "e" and "r" characters could be included. Thus, even though the selection areas for some of the characters may not be able to be extended in one or more directions, the additional vertical spacing can allow a user to more easily select a single character or a single suggested input.

Figure 7:
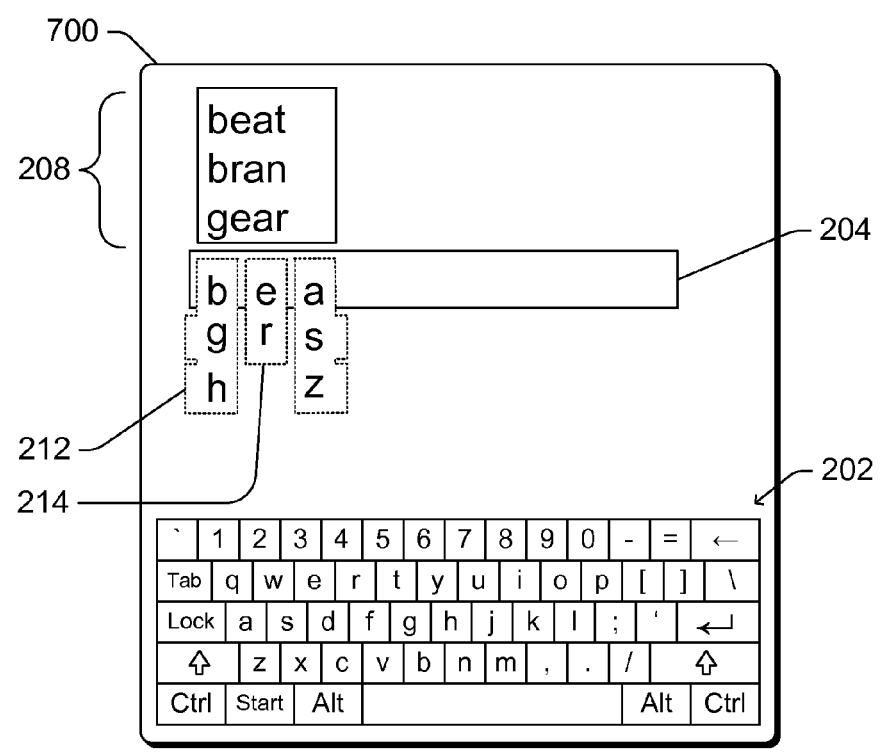

FIG. 7 shows another example user interface that can be displayed in accordance with one or more embodiments of the concurrently displaying multiple characters for input field positions. User interface 700 of FIG. 7 is similar to user interface 500 of FIG. 5, except that the character lists have been illustrated with dashed lines representing the selection areas for the characters in the character list. As can be seen in user interface 700, the selection areas of the "g" and "h" characters are larger in the left direction and the selection areas of the "s" and "z" characters are larger in the right direction as there is sufficient space in the user interface to extend those selection areas in that direction. However, there is insufficient space to extend the selection areas for the "b", "e", "r", "a", "s", and "z" characters in the left direction, so those selection areas are not extended. Similarly, there is insufficient space to extend the selection areas for the "b", "g", "h", "e", "r", and "a" characters in the right direction, so those selection areas are not extended. Alternatively, the selection area of the "h" character could be larger in the right direction, the selection area of the "r" character could be larger in the down direction, and/or the selection area of the "z" character could be larger in the left direction.

Alternatively, additional spacing between the "b" and "g" characters, between the "g" and "h" characters, between the "e" and "r" characters, between the "a" and "s" characters, and between the "s" and "z" characters could be included. Thus, even though the selection areas for some of the characters may not be able to be extended in one or more directions, the additional vertical spacing can allow a user to more easily select a single character or a single suggested input.

It should also be noted that, as can be seen from the examples of FIGS. 6 and 7, the selection areas for characters in character lists and/or suggested inputs in input suggestion lists can change as additional user inputs are received. For example, the selection area for the character "r" is larger in user interface 600 of FIG. 6 than in user interface 700 of FIG. 7, as the additional character list displayed in user interface 700 prevents the selection area for the character "r" from being larger in the right direction.

Figure 8:
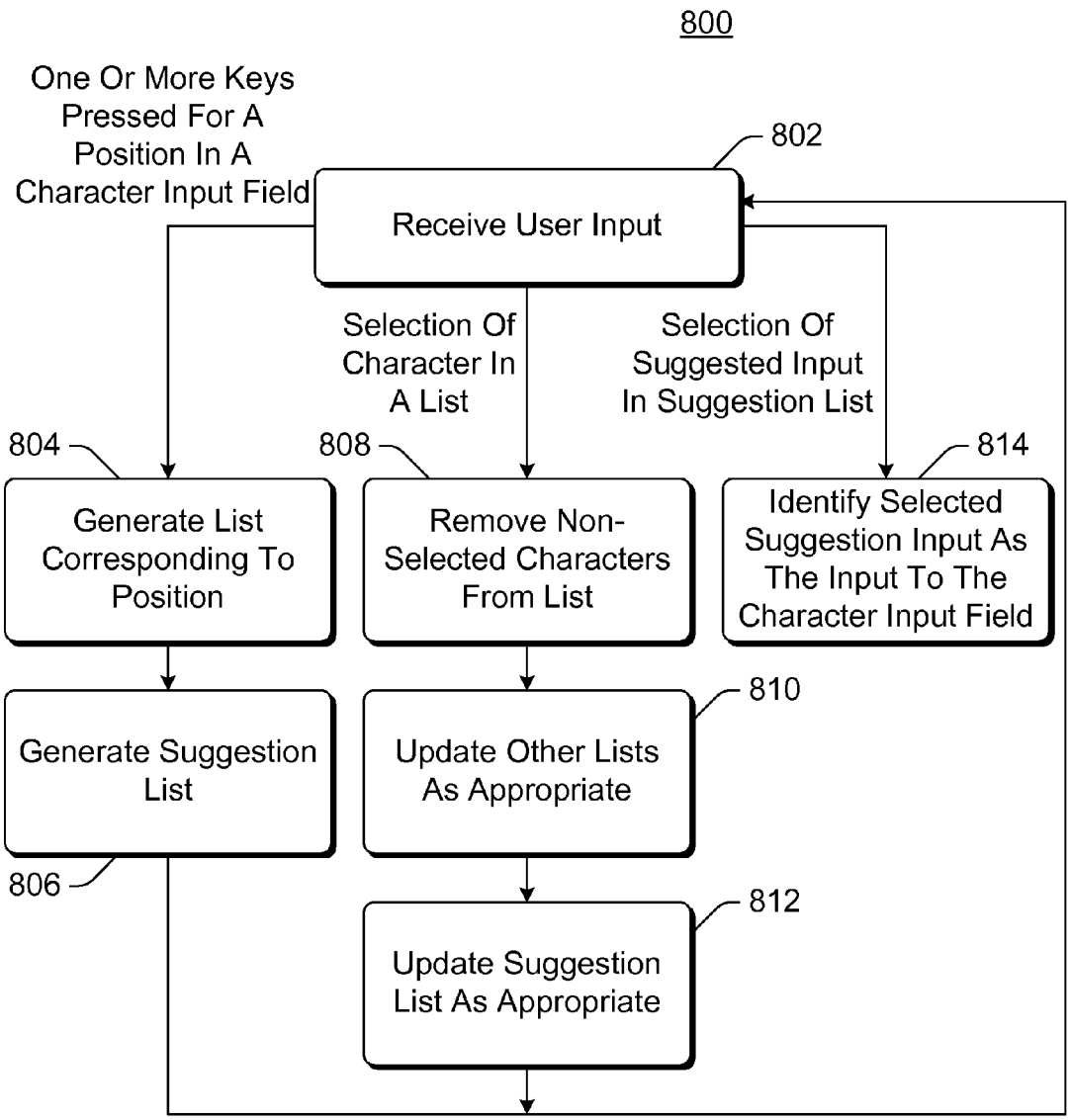
FIG. 8 is a flowchart illustrating an example process for concurrently displaying multiple characters for input field positions in accordance with one or more embodiments.

FIG. 8 is a flowchart illustrating an example process 800 for concurrently displaying multiple characters for input field positions in accordance with one or more embodiments. Process 800 is carried out by a device, such as computing device 102 of FIG. 1, and can be implemented in software, firmware, hardware, or combinations thereof. Process 800 is an example process for concurrently displaying multiple characters for input field positions; additional discussions of concurrently displaying multiple characters for input field positions are included herein with reference to different figures.

In process 800, a user input is received (act 802). This user input can be one or more keys that are pressed to input a character for a particular position in the character input field, the selection of a character in a character list corresponding to a particular position in the character input field, or selection of a suggested input in a suggestion list.

If the user input is one or more keys that are pressed to input a character for a particular position in the character input field, then a character list corresponding to that position is generated (act 804). This character list that is generated includes one or more characters based on one or more keys that are touched by the user as discussed above. A suggestion list including one or more input suggestions is also optionally generated (act 806). The entries in the suggestion list are dependent on the characters in the character lists corresponding to positions in the character input field that have been generated as discussed above. Process 800 then returns to act 802 to receive another user input.

If the user input is selection of a character in a character list corresponding to a particular position in the character input field, then non-selected characters are removed from that character list (act 808). Other character lists are also optionally updated as appropriate (act 810). As discussed above, other character lists corresponding to other positions in the character input field can be updated by having characters removed that do not form valid inputs based on an input library. A suggestion list that is displayed is also optionally updated as appropriate (act 812). As discussed above, removing characters from one or more character lists can result in a change in the suggested inputs that are included in the suggestion list. Process 800 then returns to act 802 to receive another user input.

If the user input is selection of a suggested input in a suggestion list, then the selected suggestion input is identified as the input to the character input field (act 814). Process 800 can then end. Alternatively, after act 814 process 800 can return to act 802 to receive another user input.

In one or more embodiments, process 800 also supports a "terminate" or "exit" option for the user to indicate completion of user inputs. Thus, rather than completing input into the character input field, the user can exit process 800 by selecting this terminate or exit option (e.g., by pressing a spacebar, by pressing an arrow key, etc.).

Figure 9:
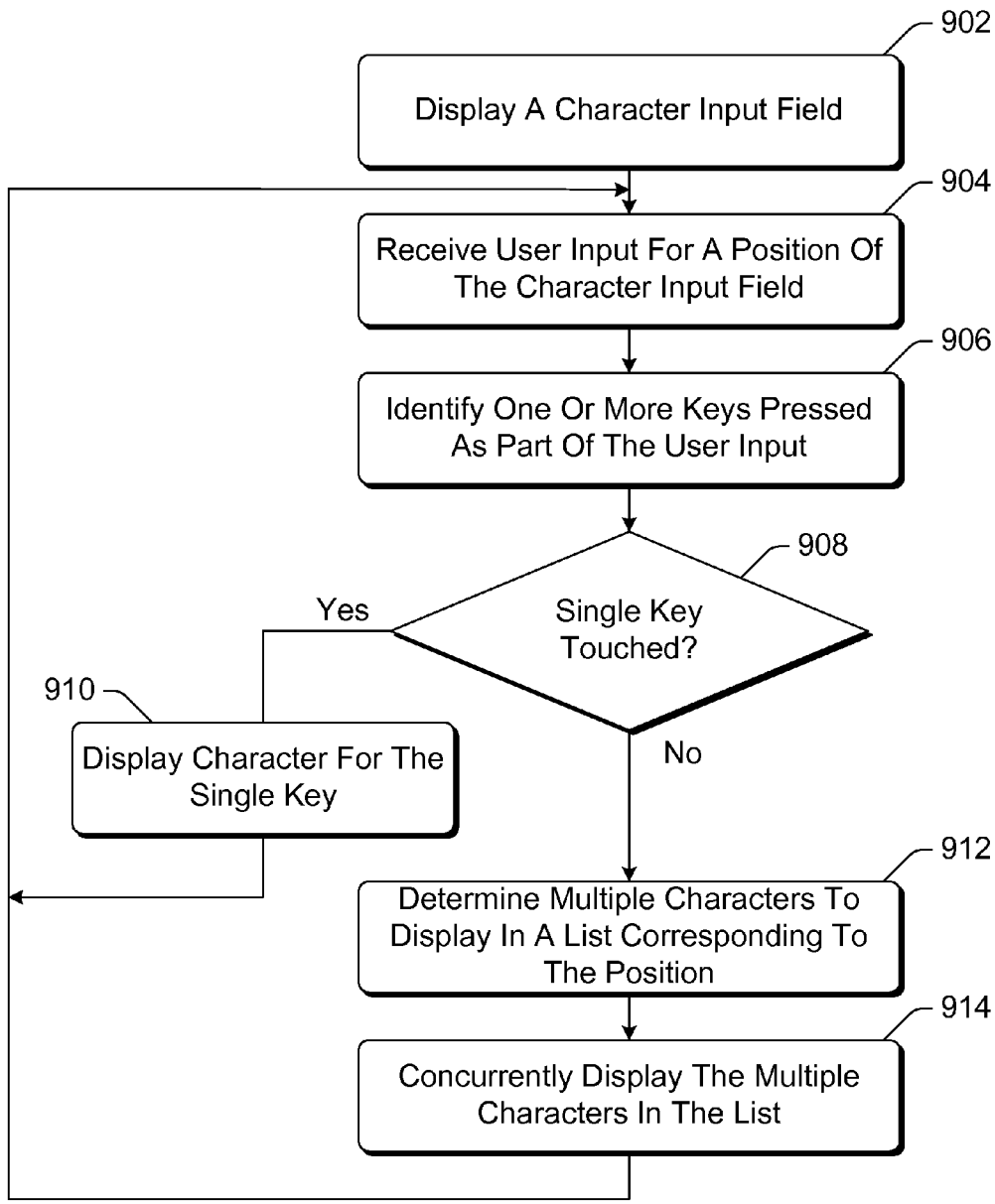
FIG. 9 is a flowchart illustrating an example process for generating a character list in accordance with one or more embodiments.

FIG. 9 is a flowchart illustrating an example process 900 for generating a character list in accordance with one or more embodiments. Process 900 is carried out by a device, such as computing device 102 of FIG. 1, and can be implemented in software, firmware, hardware, or combinations thereof. Process 900 is an example process for generating a character list; additional discussions of generating a character list are included herein with reference to different figures.

In process 900, a character input field is displayed (act 902). A user input for a position of the character input field is received (act 904). As discussed above, this user input is received by the user pressing or touching one or more keys of a keyboard.

One or more keys that are pressed as part of the user input are identified (act 906). Process 900 then proceeds based on whether the user input is a single key that was touched (act 908). If the user input was a single key that was touched, then the character for that single key is displayed in the position of the character input field (acts 910). Process 900 then returns to act 904 to receive another user input for another position of the character input field.

However, if the user input is two or more keys that were touched, then multiple characters to be displayed in a character list corresponding to the position of the character input field are determined (acts 912). The multiple characters determined in act 912 are concurrently displayed in the character list corresponding to that position (acts 914). Process 900 then returns to act 904 to receive another user input for another position of the character input field.

Figure 10:
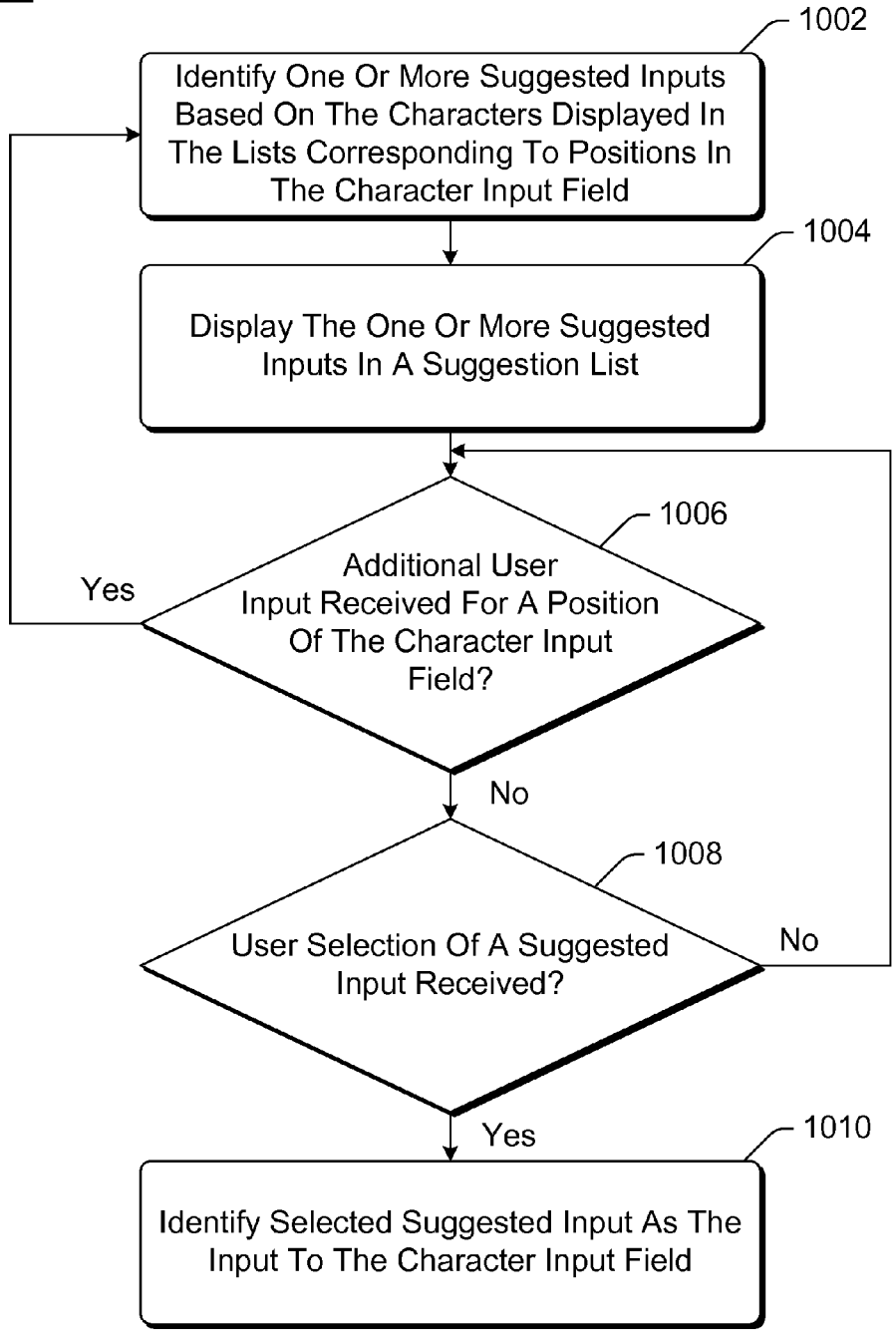
FIG. 10 is a flowchart illustrating an example process for implementing a suggestion list in accordance with one or more embodiments.

FIG. 10 is a flowchart illustrating an example process 1000 for implementing a suggestion list in accordance with one or more embodiments. Process 1000 is carried out by a device, such as computing device 102 of FIG. 1, and can be implemented in software, firmware, hardware, or combinations thereof. Process 1000 is an example process for implementing a suggestion list; additional discussions of implementing a suggestion list are included herein with reference to different figures.

In process 1000, one or more suggested inputs are identified (act 1002). As discussed above, the identification of these one or more suggested inputs is based on the characters displayed in the character lists corresponding to positions in the character input field.

The one or more suggested inputs identified in act 1002 are displayed in a suggestion list (act 1004). Process 1000 then proceeds based on whether additional user input is received for a position of the character input field (act 1006). If an additional user input is received (e.g., one or more keys of a keyboard are pressed), then process 1000 returns to act 1002 to identify one or more suggested inputs for the suggestion list.

If an additional user input is not received, then process 1000 proceeds based on whether user selection of a suggested input is received (act 1008). If a user selection of a suggested input is received, then the selected suggested input is identified as the input to the character input field (act 1010). However, if user selection of a suggested input is not received then process 1000 continues, waiting for an additional user input or user selection of a suggested input. Alternatively, process 1000 can also return to act 1002 to identify one or more suggested inputs for the suggestion list if a character in a character list corresponding to a position in the character input field is selected as discussed above. Additionally, a user may also optionally quit out of process 1000 by selecting a terminate or exit option.

Figure 11:
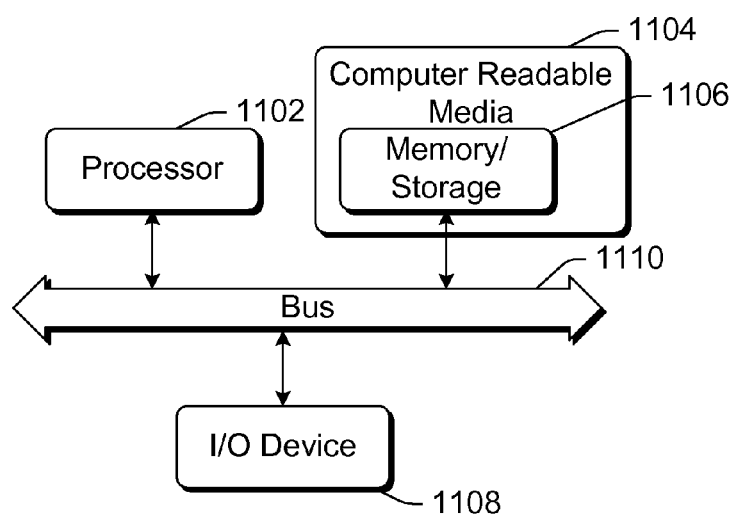
FIG. 11 illustrates an example computing device that can be configured to implement the concurrently displaying multiple characters for input field positions in accordance with one or more embodiments.

FIG. 11 illustrates an example computing device 1100 that can be configured to implement the concurrently displaying multiple characters for input field positions in accordance with one or more embodiments. Computing device 1100 can be, for example, computing device 102 of FIG. 1.

Computing device 1100 includes one or more processors or processing units 1102, one or more computer readable media 1104 which can include one or more memory and/or storage components 1106, one or more input/output (I/O) devices 1108, and a bus 1110 that allows the various components and devices to communicate with one another. Computer readable media 1104 and/or one or more I/O devices 1108 can be included as part of, or alternatively may be coupled to, computing device 1100. Bus 1110 represents one or more of several types of bus structures, including a memory bus or memory controller, a peripheral bus, an accelerated graphics port, a processor or local bus, and so forth using a variety of different bus architectures. Bus 1110 can include wired and/or wireless buses.

Memory/storage component 1106 represents one or more computer storage media. Component 1106 can include volatile media (such as random access memory (RAM)) and/or nonvolatile media (such as read only memory (ROM), Flash memory, optical disks, magnetic disks, and so forth). Component 1106 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1102. It is to be appreciated that different instructions can be stored in different components of computing device 1100, such as in a processing unit 1102, in various cache memories of a processing unit 1102, in other cache memories of device 1100 (not shown), on other computer readable media, and so forth. Additionally, it is to be appreciated that the location where instructions are stored in computing device 1100 can change over time.

One or more input/output devices 1108 allow a user to enter commands and information to computing device 1100, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The term "module" as used herein generally represents software, firmware, hardware, or combinations thereof. In the case of a software implementation, the module represents program code that performs specified tasks when executed on a processor (e.g., CPU or CPUs). The program code can be stored in one or more computer readable memory devices, further description of which may be found with reference to FIG. 11. The features of the concurrently displaying multiple characters for input field positions techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    receiving a first user input via a keyboard, the first user input comprising at least one of selection of a single key, or selection of two or more keys;
    responsive to receiving the first user input comprising selection of the single key, displaying a character corresponding to the single key in a first position of a character input field;
    responsive to receiving the first user input comprising selection of the two or more keys, concurrently displaying a character corresponding to each of the two or more keys in a first character list field adjacent to the first position of the character input field, wherein the first character list field is displayed partially overlapping the first position of the character input field;
    receiving a second user input via the keyboard, the second user input comprising a selection of two or more keys; and
    responsive to receiving the second user input, concurrently displaying, in a second character list field adjacent to a second position of the character input field, a set of characters corresponding to the two or more keys selected via the second user input:
    wherein the first character list field is a different field from the second character list field.

2. A method as recited in claim 1, further comprising displaying, in a suggestion list field, one or more suggested inputs based at least in part on the characters in the first character list field, the suggestion list field being displayed concurrently with the first character list field and the character input field.

3. A method as recited in claim 2, further comprising:
    receiving a user selection of a character in the first character list field; and
    entering the user selected character from the first character list field into the first position of the character input field.

4. A method as recited in claim 2, further comprising displaying the first character list field until a user selection of one of the one or more suggested inputs is received.

5. A method as recited in claim 1, further comprising:
    assigning, to each of the characters corresponding to each of the two or more keys selected via the first user input, a ranking based on a portion of the one of the multiple keys corresponding to the character that was selected; and
    displaying the characters in the first character list field according to the rankings of the characters.

6. A method as recited in claim 1, wherein each of the characters in the first character list field has a selection area larger than a selection area of the key of the keyboard associated with the character.

7. A device comprising:
    a user input module to identify, for each of multiple user inputs, multiple keys of a keyboard that are touched as part of the user input;
    a character determination module to determine, for each of the multiple user inputs, multiple characters that are to be displayed concurrently based on the multiple keys that are touched as part of the user input; and
    a user interface display module to concurrently display both a character input field and, for each of the multiple user inputs, a character list field comprising the multiple characters determined for each of the multiple user inputs, wherein a first character list field of the character list fields is displayed partially overlapping a first position of the character input field;
    wherein each character list field is a different field from the other.

8. A device as recited in claim 7, wherein the character determination module is further to:
    determine a first one or more characters corresponding to multiple keys that are touched as part of a first user input;
    determine a second one or more characters corresponding to multiple keys that are touched as part of a second user input;

determine a first character of the second one or more characters that cannot be combined with at least one of the first one or more characters to generate at least part of an input included in an input library; and remove the first character from the second one or more characters.

9. A device as recited in claim 7, further comprising an input suggestion module to identify one or more input suggestions based at least in part on the multiple characters determined for each of the multiple user inputs, and wherein the user interface display module is further to display the one or more input suggestions in a suggestion list field concurrently with the character input field and the character list fields that correspond to each of the multiple user inputs.

10. A device as recited in claim 9, wherein the user input module is further to receive a user selection of one of the multiple characters displayed corresponding to a position of the character input field, wherein the character determination module is further to remove non-selected characters from the multiple characters displayed corresponding to the position of the character input field, and wherein the input suggestion module is further to remove, from the one or more input suggestions, each input suggestion having a non-selected character in a position corresponding to the position of the character input field.

11. A device as recited in claim 9, wherein the user interface display module is to continue displaying the multiple characters determined for each of the multiple user inputs until a user selection of one of the one or more input suggestions is received.

12. A device as recited in claim 7, wherein for each of the multiple user inputs, the character determination module is further to assign, to each of the multiple characters for the user input, a ranking based on a portion of the one of the multiple keys associated with the character that is touched as the user input, and the user interface display module is further to display the multiple characters according to the rankings of the multiple characters.

13. A device as recited in claim 12, further comprising an input suggestion module to determine an ordering of multiple suggested inputs based at least in part on the rankings of the multiple characters.

14. A device as recited in claim 7, wherein the user interface display module is further to display each of the multiple characters with a selection area larger than a selection area of the key of the keyboard associated with the character.

15. A device as recited in claim 7, wherein the keyboard comprises a touch input screen.

16. A computer storage hardware media having stored thereon instructions that, when executed by one or more processors of a device, cause the one or more processors to:

receive a first user input comprising a selection of two or more keys;

responsive to receiving the first user input, display a character corresponding to each of the two or more keys selected via the first user input in a first character list field adjacent to a first position of a character input field, wherein the first character list field is displayed partially overlapping the first position of the character input field;

receive a second user input comprising a selection of two or more keys; and responsive to receiving the second user input, display a character corresponding to each of the two or more keys selected via the second user input in a second character list field adjacent to a second position of the character input field:

wherein the first character list field is a different field from the second character list field.

17. A computer storage hardware media of claim 16, having stored further instructions that cause the one or more processors to identify, based, at least in part, on the first user input and the second user input, a suggestion list that includes at least one character from the first character list field and at least one character from the second character list field.

18. A computer storage hardware media of claim 16, wherein the first and second character list fields are displayed concurrently with the character input field.

19. A computer storage hardware media of claim 16, having stored further instructions that cause the one or more processors to display, in a suggestion list field, one or more suggested inputs based at least in part on the characters in the first character list field, the suggestion list field being displayed concurrently with the first character list field and the character input field.

20. A method as recited in claim 1, wherein the keyboard comprises a touch input screen.

* * * * *